(12) United States Patent
Appel et al.

(10) Patent No.: US 9,800,659 B2
(45) Date of Patent: Oct. 24, 2017

(54) ENTERPRISE PEER-TO-PEER STORAGE AND METHOD OF MANAGING PEER NETWORK STORAGE

(71) Applicant: International Business Machines Corporation, Armonk, NY (US)

(72) Inventors: Ana P. Appel, Sao Paulo (BR); Silvia C. S. Bianchi, Sao Paulo (BR); Heloisa C. de S. P. Candello, Campinas (BR); Renato L. de F. Cunha, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 14/611,525

(22) Filed: Feb. 2, 2015

(65) Prior Publication Data
US 2016/0226973 A1    Aug. 4, 2016

(51) Int. Cl.
*H04L 29/08*   (2006.01)
*G06Q 10/10*   (2012.01)
*G06Q 30/02*   (2012.01)

(52) U.S. Cl.
CPC ......... *H04L 67/1097* (2013.01); *G06Q 10/10* (2013.01); *G06Q 30/02* (2013.01);
(Continued)

(58) Field of Classification Search
None
See application file for complete search history.

(56) References Cited

U.S. PATENT DOCUMENTS 6,640,241 B1 * 10/2003 Ozzie .................. H04L 12/1813
                                                     709/204
6,859,821 B1 *  2/2005 Ozzie ................ G06F 17/30168
                                                     707/999.201
(Continued)

FOREIGN PATENT DOCUMENTS

EP    1573592    6/2008
EP    1952255    8/2008
(Continued)

OTHER PUBLICATIONS

Yizhou Sun, Jie Tang, Jiawei Han, Manish Gupta, and Bo Zhao. 2010. Community evolution detection in dynamic heterogeneous information networks. In Proceedings of the Eighth Workshop on Mining and Learning with Graphs (MLG '10). ACM, New York, NY, USA, 137-146.
(Continued)

*Primary Examiner* — Ninos Donabed
(74) *Attorney, Agent, or Firm* — Law Office of Charles W. Peterson, Jr.; Louis J. Percello, Esq.

(57) ABSTRACT

A peer-to-peer storage system, method and program product for managing peer-to-peer storage in an enterprise network. Peers use networked devices to log into an enterprise social platform with a unique identification (ID) that identifies a respective enterprise network user. Users may be members of enterprise network groups. When a group member peer requests a copy of a file the file associated with the group, the networked device determines whether other members have stored replicas of the file. If replicas are stored with other members, the networked device receives one of those. Otherwise, the networked device receives a copy from the enterprise social platform, and that copy is stored with one of the group members.

14 Claims, 7 Drawing Sheets

(52) U.S. Cl.
CPC ........ *H04L 67/104* (2013.01); *H04L 67/1046* (2013.01); *H04L 67/1078* (2013.01)

(56) References Cited

U.S. PATENT DOCUMENTS

| | | | |
|---|---|---|---|
| 7,454,465 B2* | 11/2008 | Manion | H04L 65/1073 709/204 |
| 7,711,775 B2* | 5/2010 | Tavis | G06F 8/65 709/201 |
| 7,721,110 B2* | 5/2010 | Kouznetsov | G06F 17/30206 709/201 |
| 7,886,034 B1 | 2/2011 | Hartmann | |
| 7,996,547 B2* | 8/2011 | Sudhakar | H04L 67/104 709/224 |
| 8,051,205 B2 | 11/2011 | Roy | |
| 8,239,492 B2 | 8/2012 | Pottenger | |
| 8,255,736 B2 | 8/2012 | Agundez Dominguez | |
| 8,280,958 B2 | 10/2012 | Chavez | |
| 8,281,023 B2 | 10/2012 | Dondetti | |
| 8,296,398 B2 | 10/2012 | Lacapra | |
| 8,307,026 B2 | 11/2012 | Gusler | |
| 8,316,098 B2 | 11/2012 | Luna | |
| 8,352,692 B1 | 1/2013 | Jordan | |
| 8,356,080 B2 | 1/2013 | Luna | |
| 8,364,758 B2 | 1/2013 | Hydrie | |
| 8,458,172 B2 | 6/2013 | Gerber | |
| 2003/0236820 A1* | 12/2003 | Tierney | G06F 21/10 709/203 |
| 2004/0088646 A1* | 5/2004 | Yeager | H04L 29/06 715/229 |
| 2005/0102364 A1* | 5/2005 | Ozzie | G06F 17/30168 709/207 |
| 2005/0216556 A1* | 9/2005 | Manion | H04L 65/1073 709/204 |
| 2007/0136370 A1* | 6/2007 | Frieder | G06F 17/30206 |
| 2007/0288446 A1* | 12/2007 | Frieder | G06F 17/30206 |
| 2007/0294257 A1* | 12/2007 | Frieder | G06F 17/30206 |
| 2008/0120295 A1* | 5/2008 | Frieder | G06F 17/30109 |
| 2008/0288580 A1* | 11/2008 | Wang | H04L 29/12509 709/203 |
| 2009/0157814 A1 | 6/2009 | Lee | |
| 2010/0250713 A1* | 9/2010 | Sudhakar | H04L 67/104 709/219 |
| 2011/0035503 A1* | 2/2011 | Zaid | H04L 63/0407 709/228 |
| 2011/0047070 A1* | 2/2011 | Farias | G06Q 20/102 705/38 |
| 2011/0078129 A1* | 3/2011 | Chunilal | G06F 17/30867 707/706 |
| 2011/0137991 A1* | 6/2011 | Russell | G06Q 10/06 709/204 |
| 2012/0311339 A1 | 12/2012 | Irvine | |
| 2013/0007218 A1 | 1/2013 | Shah | |
| 2016/0191608 A1* | 6/2016 | Zaid | H04L 63/0407 709/203 |

FOREIGN PATENT DOCUMENTS

| | | |
|---|---|---|
| WO | WO2002065329 | 8/2002 |
| WO | WO2002089488 | 11/2002 |
| WO | WO2004019158 | 8/2004 |
| WO | WO2005062572 | 7/2005 |
| WO | WO2007100509 | 9/2007 |
| WO | WO2009002835 | 12/2008 |
| WO | WO2009142851 | 11/2009 |
| WO | WO2012093835 | 12/2012 |

OTHER PUBLICATIONS

Derek Greene, Donal Doyle, and Padraig Cunningham. 2010. Tracking the Evolution of Communities in Dynamic Social Networks. In Proceedings of the 2010 International Conference on Advances in Social Networks Analysis and Mining (ASONAM '10). IEEE Computer Society, Washington, DC, USA, 176-183.

Mansoureh Takaffoli, Farzad Sangi, Justin Fagnan, Osmar R. Zäiane, Community Evolution Mining in Dynamic Social Networks, Procedia—Social and Behavioral Sciences, vol. 22, 2011, pp. 49-58.

* cited by examiner

ENTERPRISE PEER-TO-PEER STORAGE AND METHOD OF MANAGING PEER NETWORK STORAGE

BACKGROUND OF THE INVENTION

Field of the Invention

The present invention is related to shared document management and more particularly to shared document management and storage for enterprise group collaboration documents.

Background Description

Social networks, such as Facebook, Twitter and Myspace, have become ubiquitous. Enterprises, especially large enterprises such as large, multinational corporations, are adapting closed (internal) social networking to different contexts within the particular enterprise. These enterprise social networks can improve co-worker relationships in, and across, different enterprise divides or groups, e.g., departments, sites, and/or country borders. Using a closed social network enterprise workers can connect with, and join with, other worker members for collaborating and sharing ideas, internal documents and information. Social network users (e.g., enterprise management and workers) can form groups of project team members for each project to facilitate project intercommunication. Similarly, users can form other ad hoc communities, work related or common interest, e.g., company sports teams or other after-work activities.

Within these groups, group members can create activity streams, upload/download and share documents. On a typical project, members may update shared documents, frequently. Disseminating updates, multiple times, is critical for improved organization-wide collaboration and coordination. Typically, however, with each update old versions may become irrelevant. However, users seldom erase old versions as new versions become available. Further, occasionally, there may be a need to refer to, or even backtrack and undo, recent updates. Thus, it may be desirable to keep some number of old versions. Depending on the number of collaborators on a particular document, however, the overhead for maintaining several different versions of the same document, on several different user machines, may be inordinately high. While collecting all of different versions on dedicated, central storage might reduce this overhead, this also requires dedicated storage that is sufficiently elastic to match an increasing/expanding amount of data. Unfortunately, the expense of providing sufficient dedicated local or cloud storage to guarantee availability and reliability may be prohibitive. Public cloud storage, for example, may be sufficient to store the data, but data privacy is an issue with typical public clouds.

Furthermore, enterprises are fluid entities with employees and employee responsibilities fluid or changing. Changes in employees and associated responsibilities frequently changes enterprise group membership. For an example, existing projects may add newly hires or transfers. Likewise employees may leave the projects over time, e.g., when someone quits, gets fired, transfers or receives a promotion. These employee changes change projects members and member relationships and, as a result, social network group membership. In addition, a typical project may change due to its dynamic nature, or because of widely varying activity with highly active peak periods, demarcated by lull periods of little activity. Also, as a project winds down and ends, the associated community may retain interests and responsibilities. Typical storage systems providing storage capability for enterprise groups require a significant effort and resulting overhead (i.e., expense) to accommodate this fluidity.

Thus, there is a need for reducing enterprise collaboration data storage overhead, and for consolidating collaboration data handling; and more particularly, for reducing the volume of redundant data collected, as well as stale data collecting, and stored in enterprise-wide collaborative projects.

SUMMARY OF THE INVENTION

A feature of the invention is self-managing peer-to-peer storage;

Another feature of the invention is self-managing peer-to-peer storage for an enterprise social network;

Yet another feature of the invention is an enterprise social network peer-to-peer storage system;

Yet another feature of the invention is self-managing enterprise social network peer-to-peer cloud based storage.

The present invention relates to a peer-to-peer storage system, method and program product for managing peer-to-peer storage in an enterprise network. Peers use networked devices to log into an enterprise social platform with a unique identification (ID) that identifies a respective enterprise network user. Users may be members of enterprise network groups. When a group member peer requests a copy of a file the file associated with the group, the networked device determines whether other members have stored replicas of the file. If replicas are stored with other members, the networked device receives one of those. Otherwise, the networked device receives a copy from the enterprise social platform, and that copy is stored with one of the group members.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
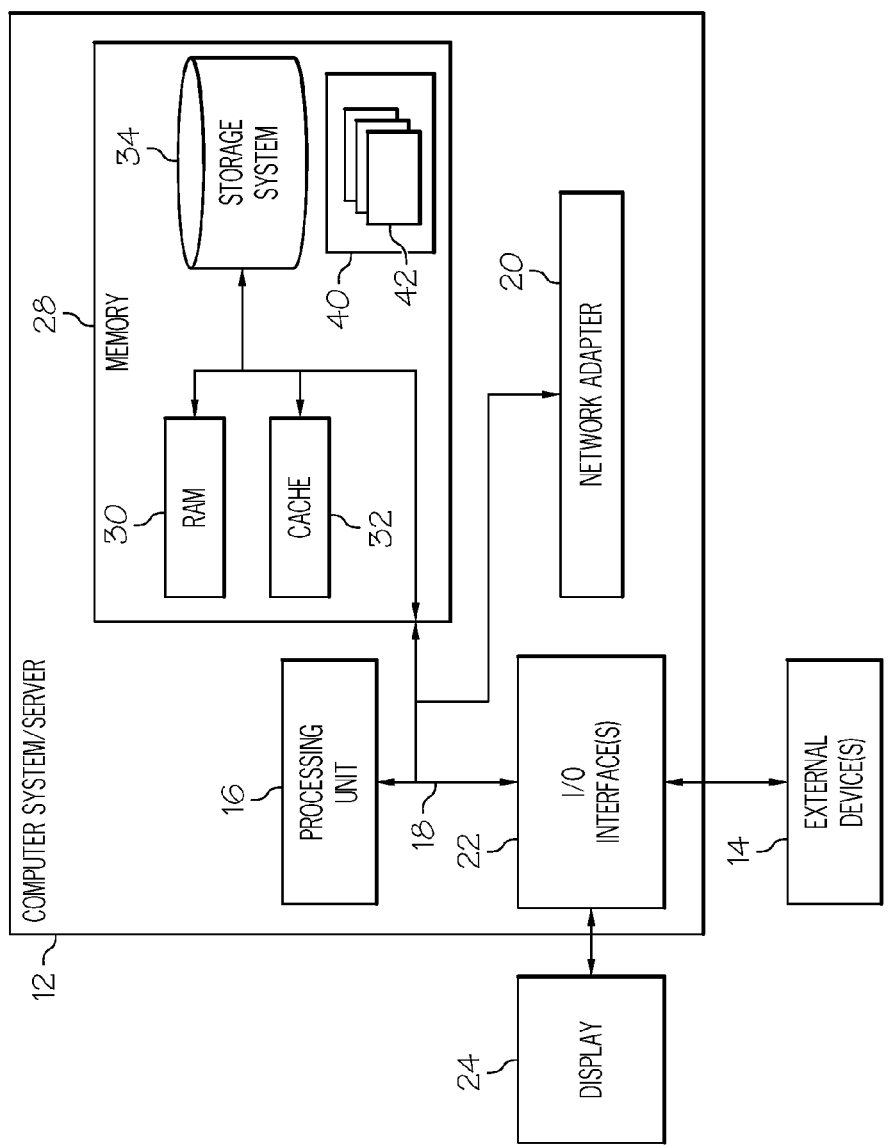
FIG. 1 depicts a cloud computing node according to an embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is further understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed and as further indicated hereinbelow.

Peer-to-peer (P2P) computing or networking is a distributed application architecture that partitions tasks or workloads between peers. P2P network devices, or peers, are network nodes of equally privileged, equipotent participants in the P2P application. Peers may make a portion of their resources, such as disk storage, directly available to other network participants, without the need for central coordination by servers or stable hosts. Typically, peers are both suppliers and consumers of resources. This is in contrast to the traditional client-server model in which the consumption and supply of resources is divided.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
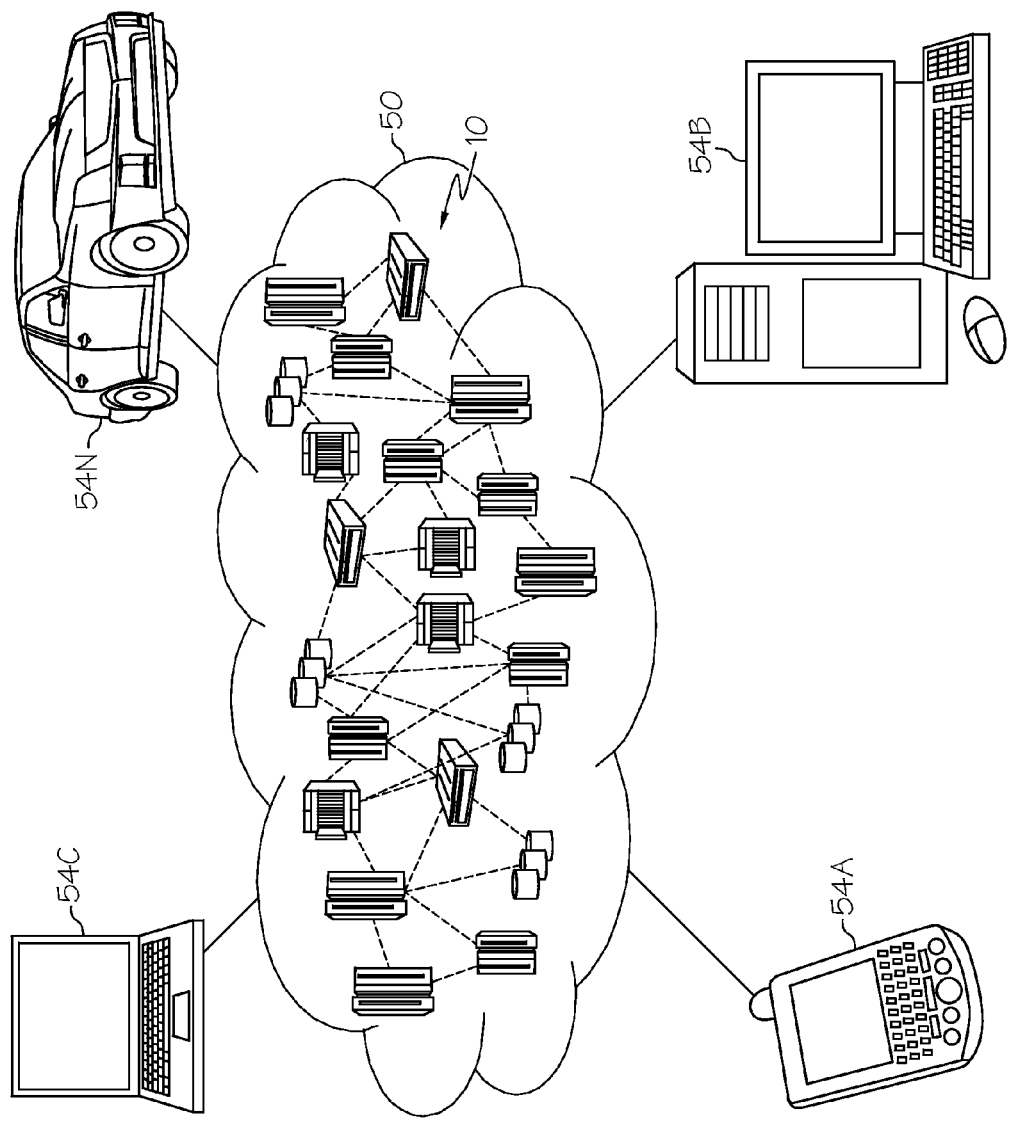
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
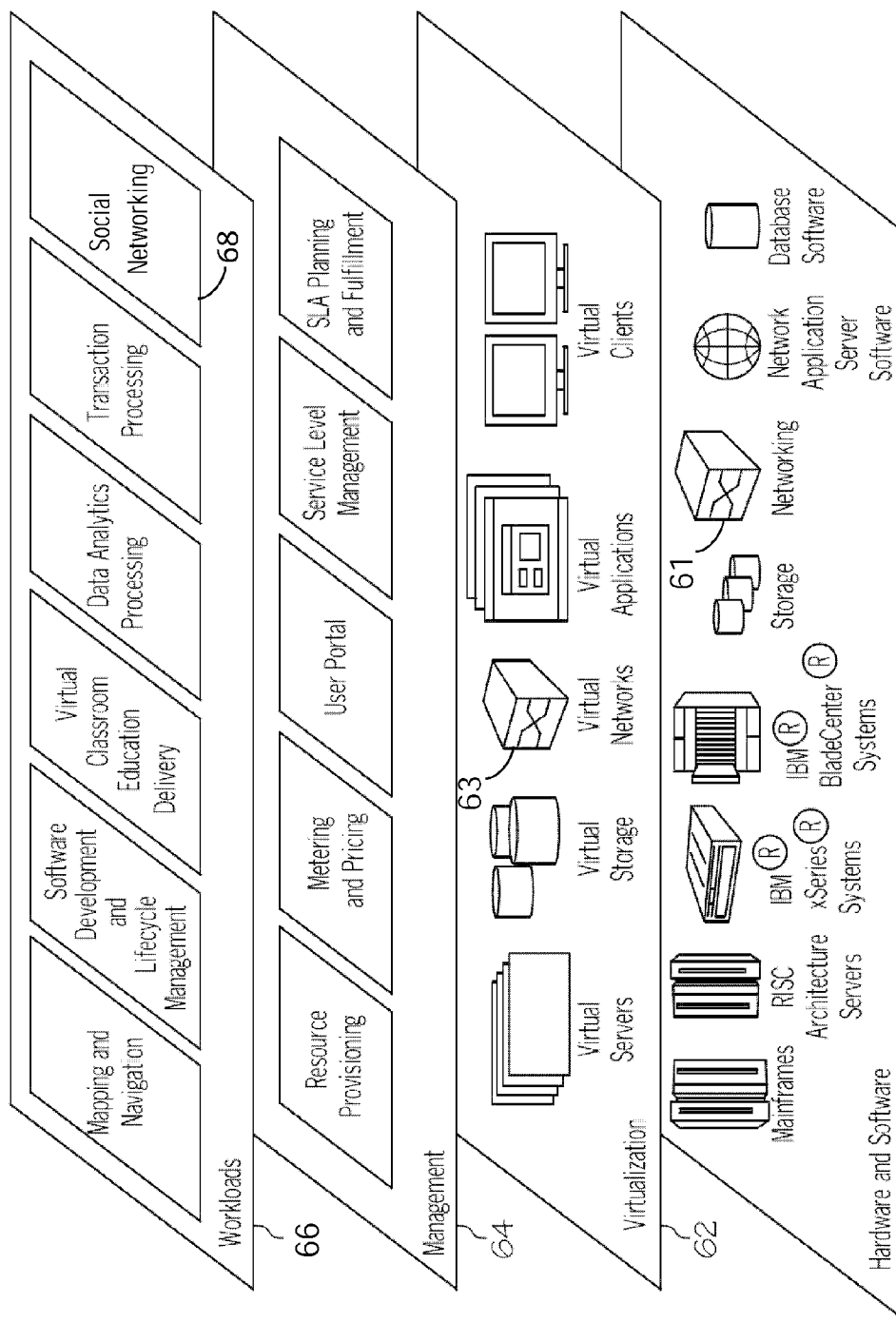
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks 61 and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks 63, including virtual private networks; virtual applications and operating systems; and virtual clients.

In one example, management layer 64 may provide the functions described below. Preferred, context aware resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Preferred, context aware service level management provides cloud computing resource allocation and management such that required service levels are met. Preferred, context-aware Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and social networking 68.

Figure 4:
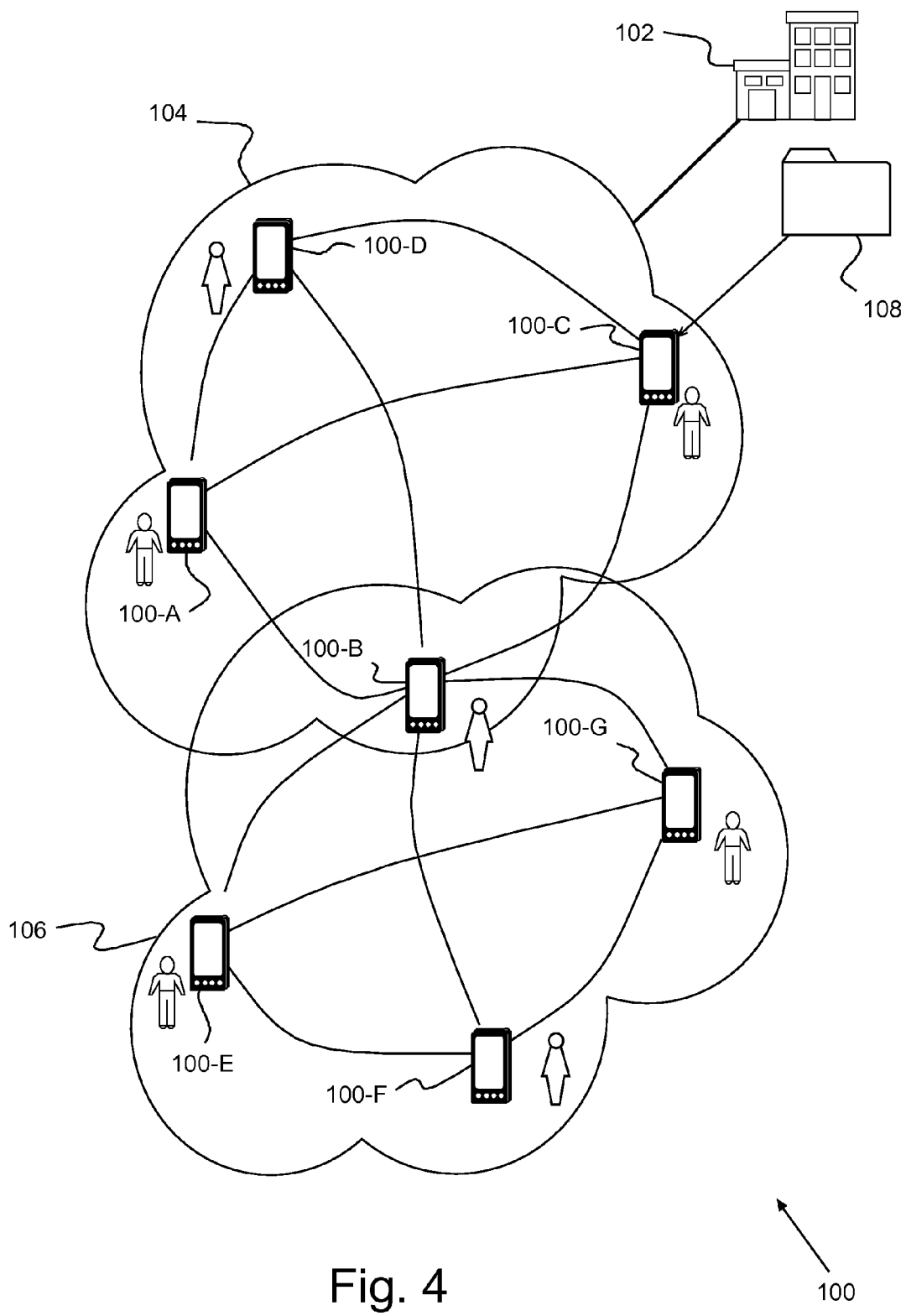
FIG. 4 shows an example of enterprise network peer-to-peer storage system, according to a preferred embodiment of the present invention.

FIG. 4 shows an example of enterprise network (e.g., 50, 61, 63 in FIGS. 1 and 2) peer-to-peer storage system 100 with peers managing distributed file replicas, according to a preferred embodiment of the present invention. An enterprise social platform 102 may include one or more computers, e.g., 10. Previously, enterprise peers/workers, also generally referred to herein as users, have registered with the enterprise social platform 102. User devices 100-A, 100-B, 100-C, 100-D, 100-E, 100-F, 100-G, e.g., in computers 10, 54A, 54B, 54C or 54N, are associated with logged-in users. In this example, the users 100-A, 100-B, 100-C, 100-D are associated users identified with members of ongoing project community 104. Users 100-B, 100-E, 100-F, 100-G are members of social community 106 (for example same department or division). Also in this example, one user 100-B belongs to both communities, enterprise project 104 and a social community 106. It should be noted that users join by connecting related devices 100-A, 100-B, 100-C, 100-D, 100-E, 100-F, 100-G, e.g., through the Internet or an intranet. For simplicity of description users, peers and related devices are used interchangeably herein.

For example, a user, e.g., 100-C, may initiate an upload or a transfer of a project 104 related file 108 from enterprise platform 102, e.g., in storage 34 in FIG. 1. Normally, replicas of the file 108 are stored within project 104 member devices with one or more other users 100-A, 100-B, 100-D. If a user, e.g., 100-B, chooses to associate the file 108 to user's profile, but not to share with other enterprise users, then other, social community 106 users (for example, from the same department or division) 100-E, 100-F, 100-G store the file 108. To determine which users store the file 108 from 100-C or 100-B, the system pre-processes that file, inferring context or tags, e.g., project or subject. The system may infer context or tags using traditional keyword extraction techniques, such as supervised machine learning, text mining, word frequency analysis, Bayes classifier, or lexical chains. Then, the system recommends a set of users connected to 100-B or 100-C in the social community 106 or 104, related to the inferred file context/tag.

Thus, rather than each user having storage limited to the respective available device 100-A, 100-B, 100-C, 100-D, 100-E, 100-F, 100-G, the amount of available storage used is configured by systems administrators. If necessary, the available storage may be adjusted to meet system needs. The system calculates the number of users that store a replica based on temporal aspects of the social circles including, for example, the number of activities, accesses, or interactions between circle members.

A preferred peer-to-peer storage system 100 aggregates storage across peers 100-A, 100-B, 100-C, 100-D, and/or 100-B, 100-E, 100-F, 100-G for low cost collaborative, project/enterprise storage. Users store copies of project related and working activity data in enterprise social network peer devices 100-A, 100-B, 100-C, 100-D, 100-E, 100-F, 100-G. The peers 100-A, 100-B, 100-C, 100-D, 100-E, 100-F, 100-G use social network temporal characteristics to dynamically manage and distribute the file replicas among each other. For example, the replicas of file 108 from peer 100-B will be stored locally at peer's devices 100-E, 100-F and 100-G.

Figure 5:
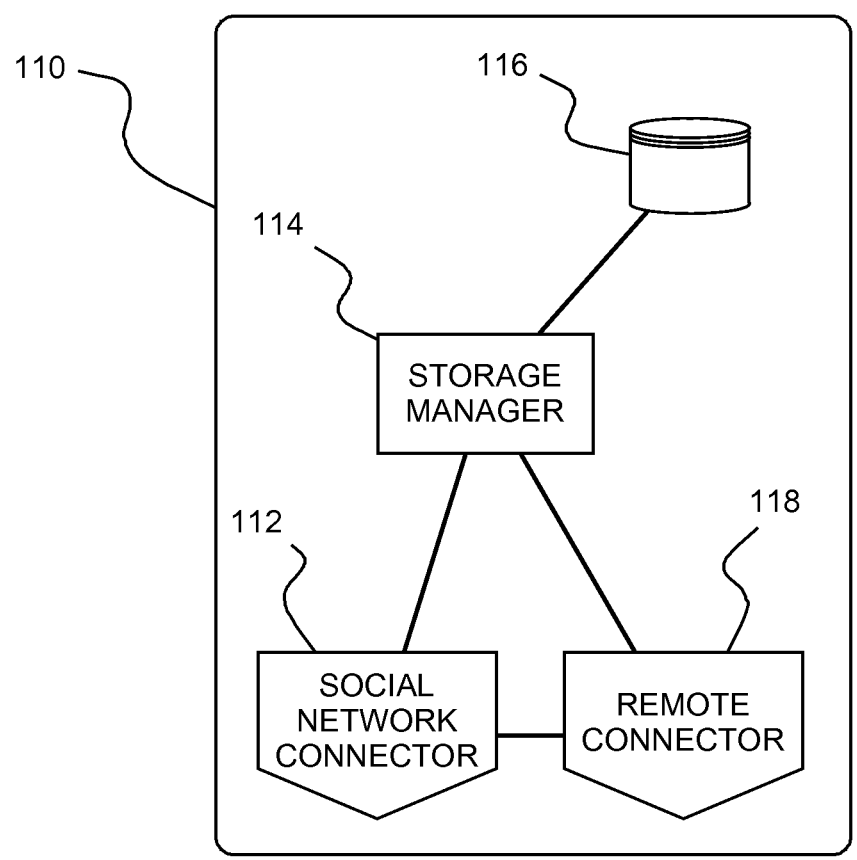
FIG. 5 shows an example of an enterprise social networking peer device in a preferred peer-to-peer (e.g., worker-to-worker) network storage system.

FIG. 5 shows an example of an enterprise social networking peer device 110 in a preferred peer-to-peer (e.g., worker-to-worker) network storage system, 100 in FIG. 4. Each peer device 110 includes a social network connector 112, a local storage manager 114, local storage 116 and a remote interface unit 118. The social network connector 112 manages peer social connection activity. The local storage manager 114 manages all storage network user data stored in local storage 116. The remote interface unit 118 manages the retrieval and transfers, including upload and download requests to/from other peer devices 110.

The peer devices (100-A, 100-B, 100-C, 100-D, 100-E, 100-F, 100-G in FIG. 4) authenticate in a social network, e.g., 50, 61, 63 in FIGS. 2 and 3, joining/rejoining groups 104, 106. After joining, the social network connector 112 in each device 110 intercepts all attempts to access files associated to enterprise communities or profiles. The social network connector 112 authenticates access attempts and couples authenticated files to complete access. The social network connector 112 also manages any new uploads, detecting associated file contexts/tags, and recommending and displaying a list of users or user set for storing each new upload based on social network temporal characteristics.

The local storage manager 114 manages all the data that is stored on the particular device 110 in local storage 116. Thus, the local storage manager 114 stores data, retrieves stored data, and manages the remaining unused storage. Additionally, the local storage manager 114 maintains the status of all stored copies and selectively deletes stale replicas/copies, e.g., based on an expiration date and diminished use. Local storage 116 may be any suitable non-volatile storage, such as a hard disk drive, or flash memory that may be permanent or exchangeable, e.g., a solid state disk (SSD), micro SD or XD cards or the like.

The remote interface unit 118 manages individual file storage and file transfers to/from other peer devices 110. When a member causes a peer device 110 to share a document, other peer devices 110 download a copy of the shared document, which the remote interface unit 118 treats as a replica of the original. Further, the remote file storage 116 and transfer unit 118 responds to remote user requests from other peer devices 110 for uploading or downloading stored files and manages file retrieval and transfer. The remote interface unit 118 maintains the state of all files shared with, and stored remotely on, the user peer device 110. The peer device 110 treats each new replica version of a file as a new file.

Preferably, as noted hereinabove, each group member has a single identifier/login or user ID and for each group one or more members are designated as group administrator(s). Since each group member has a single ID, even when a member connects from multiple devices 110 (e.g., a smart phone 54A, a desktop computer 54B and a laptop 54C), simultaneously or separately, the member logs into the social network with the same user ID on all devices to maintain a single on-line presence. Further, preferably, each of multiple device associated with a member are peer devices 110 with a local peer-to-peer storage system managing storage in the respective device 110. Optionally, the devices 110 may include any state of the art security and/or privacy, e.g., message and file encryption cryptography and file transfer authorization.

Figure 6:
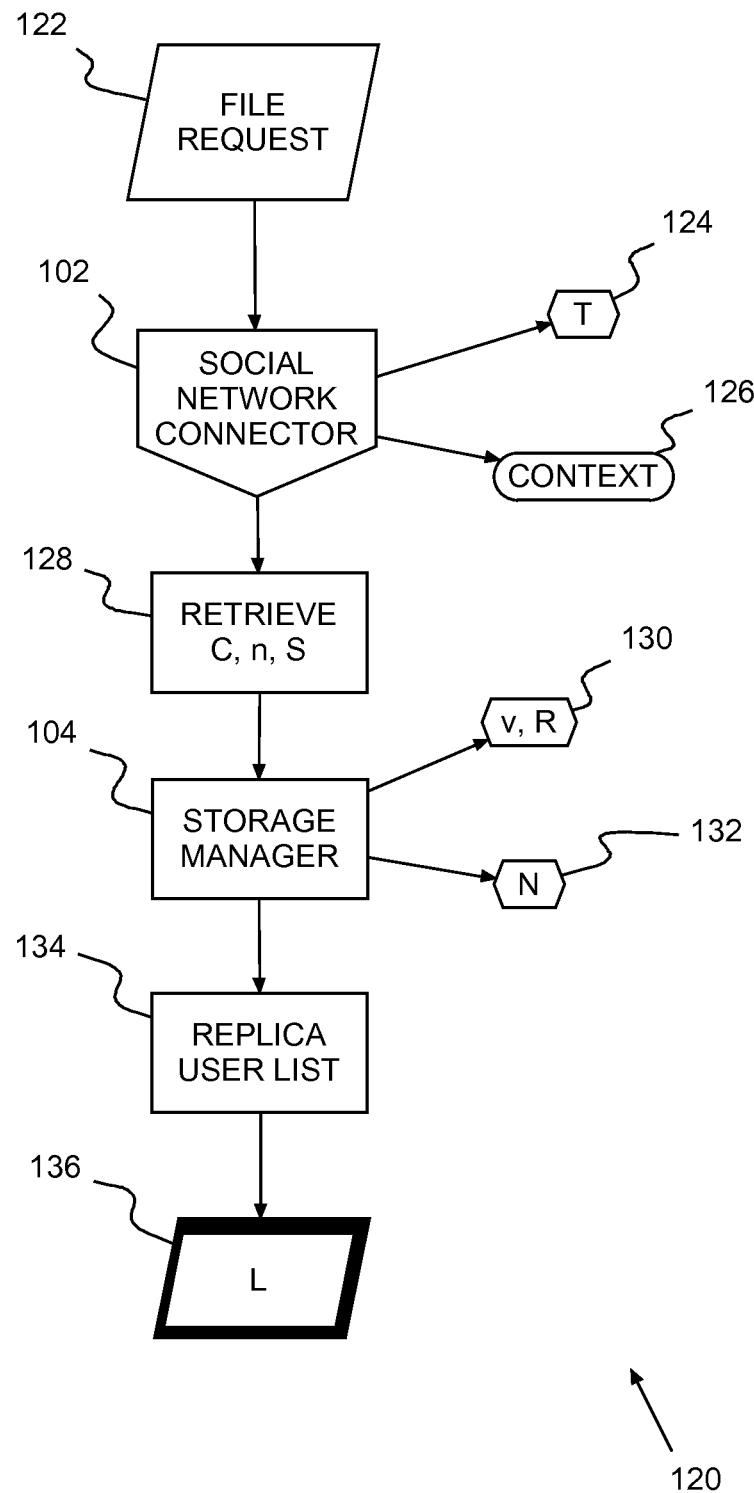
FIG. 6 shows an example of peer device recommending a set of users to store files on a peer device in response to a new file upload request.

FIG. 6 shows an example of peer device (e.g., 110 in FIG. 5) recommending 120 a set of users to store replicas of the files on a peer device 110 in response to a new file upload request 122 from the file owner. The remote connector 118 manages the file owner request, forwarding the request to a set of peers selected from the list 136. The social community selected to store the replicas is based on the file context. The number of users from the social community in the set defines the number of document replicas stored for each particular file. The system (e.g., 100 in FIG. 1) calculates this number based on temporal aspects of the social circles 104, 106, e.g., the number of activities, accesses, or interactions between members.

The system selects the user set to maximize the probability that at least one user is always available to the file owner for accessing the replica, whenever the owner is likely to need the file. Thus, the system may select users from the social community from different geo-locations/time zones, and based on peer connectivity historical information, e.g., date/hour and duration of connectivity. Each time a peer requests 122 storing a copy, the current replica is stored with one of the user set until all users in the set stored a replica. It should be noted that because work relationships are dynamic, the set of users recommended for storing each particular replica is dynamic and may change over time.

Whenever a peer device uploads or transfers a project related file, the device system pre-processes that file to determine other peer devices from a determined social community on which to store it. Preferably, the device pre-processes to infer its context or tags, (e.g., project or subject) using traditional keyword extraction techniques, such as supervised machine learning, text mining, word frequency analysis, Bayes classifier, or lexical chains.

So, upon receiving a request 122, the social network connector 112 extracts a list 124 of tags (T) from the new file and infers 126 a file context. Then, the social network connector 112 retrieves 128 a social community or circle (C) associated to the context/tags (project or subject) and information (n) from related statistics (S). The local storage manager 114 determines 130 the number (v) of replicas (R) being maintained based on information (n) from related statistics (S). So, for example, the system 100 may store more replicas (v) for documents related to very active communities, e.g., communities with several work streams and documents uploaded, than for lower activity communities.

The user set is selected based on availability from users in the same social circle (community, project, activity or connected to the user) with the goal of maximizing document availability. Related statistics (S) may include, for example, the number of users in a particular social circle; a number of messages exchanged between users; a number of user activities posted in community or profile related documents and information; a number of uploaded files; a number of accesses to files having the same tag; a number of accesses to past file versions; and/or a tag/context relevance. Document availability may be maximum, for example, with social circle users located in different geo-location/time zones and based on peer's connectivity history, e.g., indicating when each user last accessed, or normally accesses, the social network system. Preferably the system administrator(s) defines an association function (f) to determine 130 the number of replicas (v), with the number defined by the function having the form $v=\Sigma_{i=1}^{i=N} f_i(n_i)$.

Preferably, the local storage manager 114 also determines 132 a number of replicas from a number (N) of tuples, where each tuple contains a parameter associated to a statistic information. Such a set of tuples may include, for example, a number of users (u), a number of activities (g), or a relevance (h).

From the determinations 130, 132, the local storage manager 114 selects a set of connected peers in the current social circle or community related to the inferred context/tags. Then, the local storage manager 114 generates 134 a replica user list (L) from a designated social circle (C) for display 136 to the requesting user or file owner. The device recommends the list of users, e.g., located in different geo-location/time zones, that may be based on user connectivity history indicating, for example, when each user last accessed, or normally accesses, the social network system. Again, the local storage manager 114 generates 134 the replica user list, preferably, to maximize document availability to social circle users.

The device may present the recommended user list graphically, e.g., using a typical graphical user interface (GUI), to display the recommendation in a local window, e.g., as a list, and allow the associated peer to a recommended peer or peers to store a new file copy. Further, the associated peer may select one, some, or all displayed peers, or remove or add new peers. The device includes information from selection as feedback for improved training for future recommendations. So, for example, the device may determine that unclassified documents are being stored on devices associated with one peer, but confidential documents are not. Subsequent recommendations are made based on these inferred preferences.

Figure 7:
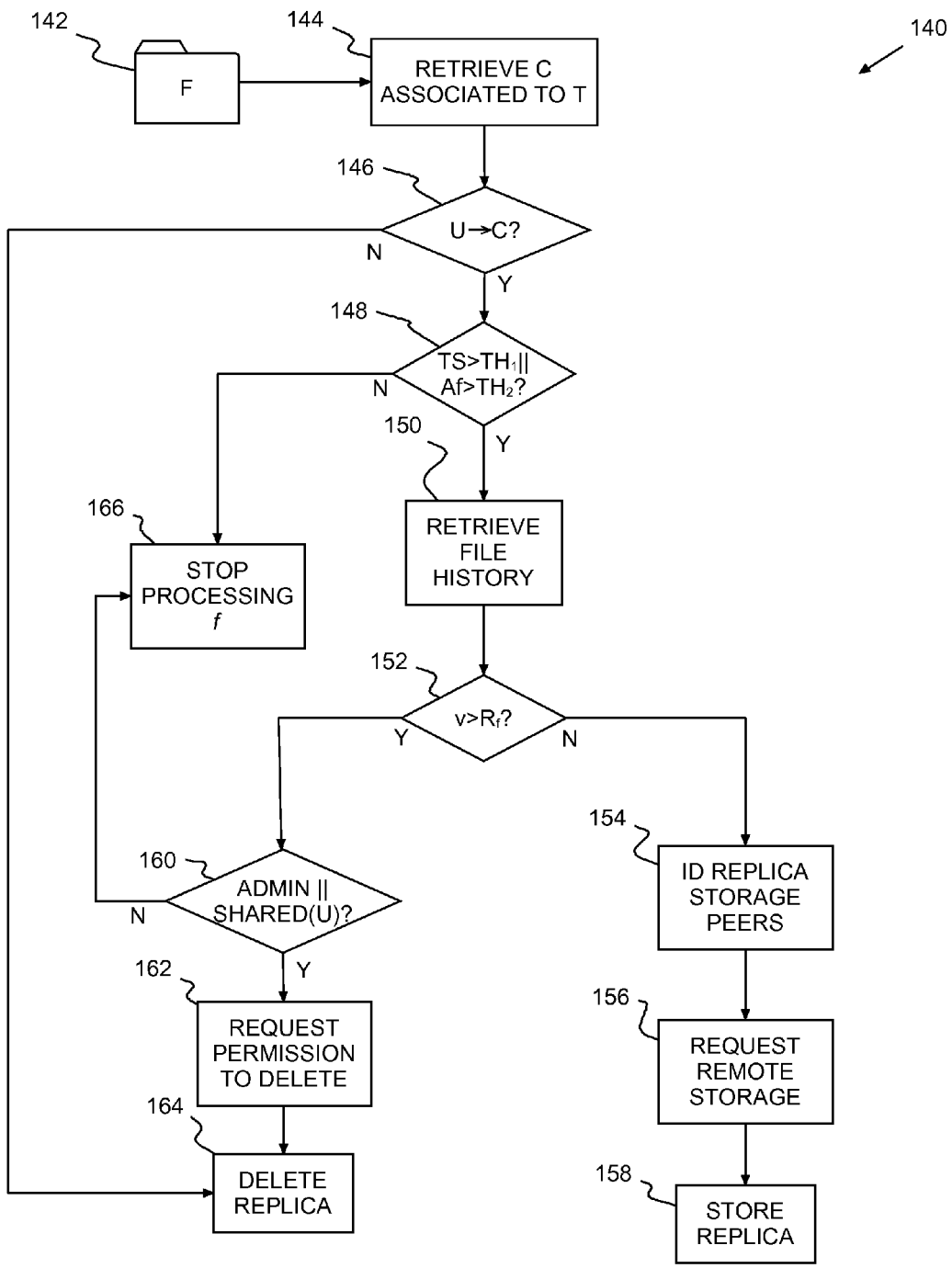
FIG. 7 shows an example of peer devices managing locally stored replicas.

FIG. 7 shows an example of how peer device (e.g., 110 in FIG. 5) local storage managers 114 manage 140 locally stored 116 replicas. Each locally stored file (F) 142 has an identified/assigned number (v) of replicas (R), a list of tags (T), an age based on a timestamp (TS) and an access count or number ($A_f$). The local storage manager 114 normally stores file replicas until they are too old (reach a certain age), and longer for more popular files or the user is no longer part of the social community. So, the system retrieves 144 the social circle, for example, project and community. If the user is no longer assigned to a project or changed department, for example, the storage manager 114 checks 146 and the replica is deleted 164 from local storage. Otherwise, the system verifies the replica 142 timestamp (TS) and the associated replica access count (Af) to determine whether the replica is old or popular. When a replica timestamp indicates that the replica is older 148 than a selected age threshold ($TH_1$) or the associated replica access count is greater than a selected threshold ($TH_2$), the storage manager retrieves 150 the file history. Otherwise, processing the file f 142 stops 166.

When the replica age exceeds $TH_1$ or is very popular 148, the local storage manager 114 retrieves file history 150, statistics and associated statistics information (S) for the file 142, including e.g., the number of file downloads and the number of file accesses/reads. From the file history the local storage manager 114 determines 152 the number of replicas ($R_f$). So, the storage manager 114 checks 152 whenever that number of replicas ($R_f$) exceeds the previously determined (130 in FIG. 6) limit, i.e., the number of replicas (v) to be stored.

If the number of currently stored replicas is below the determined number ($R_f > v$), then another peer stores the replica. The local storage manager 114 identifies 154 the set of users recommended for storing file replicas, and sends 156 a request to the set to store the replica. Any device 110 already storing a replica that receives the request, ignores the request. Otherwise, one of the receiving devices 110 stores 158 the replica.

On the other hand, if the number of stored replicas currently stored already exceeds the determined number ($v \geq R_f$), the replica is deleted from storage. If the requesting device 110 is associated 160 with an administrator, or the file 142 was shared with the user of the device 110, the local storage manager 114 sends a request 162 to the file owner to delete 164 the old replica.

Whenever a user requests restoring or access to a stored document, the preferred system retrieves an available replica. If, however, a request is to an unavailable stored file, e.g., because members in the peer set are not currently on-line, the system warns the user, e.g., through the GUI, that the file is currently unavailable. Preferably, the user can select whether to load that file, automatically, as soon as it becomes available. Simultaneously, the system also logs that the file is unavailable and records the length of unavailability. The device uses logged information during subsequent updates for determining the user set, e.g., to recommend storage to a larger or more varied set of user devices 110. Additionally, the logged information may be used for informing community users of a timeframe for unavailable files to help those other users in selecting a broader user set of devices.

Advantageously, the preferred system may use access history, e.g., user activity and availability times, to consider different time-zones for 24/7 availability (e.g., user from USA, Europe and Asia). Further, the preferred system accommodates dynamic project activity and changing co-workers relationships and responsibilities, updating replicas storage locations and numbers as circumstances change. The preferred system exploits the unused user storage, such as, on user computers, laptops, smart phones, etc., to reduce service costs. Because storage is decentralized and leverages built in trust in social network relationships to enable storage sharing, the preferred system exhibits improved resilience to correlated failures. Aggregated, shared peer device storage provides enterprise users additional project storage capacity with improved data control, privacy and security over prior public cloud storage systems; and at reduced costs for storing enterprise data.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of managing enterprise network peer-to-peer shared storage, said method comprising:
    logging into an enterprise social platform with a unique identification (ID), said ID identifying a respective user within said enterprise social platform;
    requesting a copy of a file associated with an enterprise network group, a plurality of identified users being members of said enterprise network group, each group having one or more associated files with a plurality of replicas, each said plurality of replicas being distributed among a set of group members, said set being fewer than all of the group members and selected to maximize replica availability to group members;
    determining whether a replica of the requested said copy is stored with other group members, wherein determining whether to store replicas comprises:
        determining a number of replicas to store,
        identifying said other members as candidates for storing said replicas,
        selecting said set of members from said candidates, and displaying a list listing said set;
    retrieving said copy, a replica being retrieved if replicas have been stored with other members, otherwise retrieving said copy from said enterprise social platform; and
    managing locally stored replicas and selectively storing said copy with members of a respective set, managing comprising:
        determining the age of each stored replica,
        determining whether any stored replicas is older than a selected age, and for any replicas older than said selected age,
            determining whether an access count for stored replicas is less than a selected count, and for any replicas with said access count lower than said selected count,
            determining whether the number of stored replicas is fewer than the number determined for storing, and whenever said number of stored replicas is at or above the number for storing,
            deleting one or more stored replicas, and
        selectively storing said copy with members of a respective set, whereby the volume of redundant stored data in enterprise-wide collaborative projects is reduced for increased storage capacity and maximized replica availability.

2. A method as in claim 1, wherein determining said number of replicas comprises:
    extracting a list of tags (T);
    inferring a context for said requested file; and
    retrieving a social circle (C) responsive to said context and information (n) from related statistics (S), wherein said number of replicas (v) is determined by $v = \sum_{i=1}^{i=N} f_i(n_i)$.

3. A method as in claim 2, wherein said enterprise social platform is a cloud platform, peers in said enterprise network are cloud clients, and said related statistics (S) comprise:
    the number of group members;
    a number of messages exchanged between group members;
    a number of user activities posted in community documents;
    a number of user activities posted in profile related documents and information;
    a number of uploaded files;
    a number of accesses to files having the same tag;
    a number of accesses to past file versions; and
    a tag/context relevance.

4. A method as in claim 1, wherein whenever said access count is at or above said selected count, said method further comprises waiting until said stored replicas are older than a popular file age before proceeding to determine whether the number of stored replicas is fewer than the number determined for storing.

5. A method as in claim 1, wherein storing said copy comprises:
    identifying said other members as replica storage candidates;

sending a request to store said copy to said replica storage candidates; and storing said copy with one of said replica storage candidates.

6. A method as in claim 1, wherein whenever said number of stored replicas is at or above the number for storing, said method comprises deleting one or more stored replicas.

7. A computer program product for managing enterprise network peer-to-peer storage, said computer program product comprising a non-transitory computer usable medium having computer readable program code stored thereon, said computer readable program code causing a plurality of computers executing said code to:

log into an enterprise social platform with a unique identification (ID), said ID identifying a respective user within said enterprise social platform;

request a copy of a file associated with an enterprise network group, a plurality of identified users being members of said enterprise network group, each group having one or more associated files with a plurality of replicas, each said plurality of replicas being distributed among a set of group members, said set being fewer than all of the group members and selected to maximize replica availability to group members;

determine whether replicas of the requested said copy is stored with other group members;

retrieve said copy, a replica being retrieved if replicas have been stored with other members, otherwise retrieving said copy from said enterprise social platform; and selectively store said copy with members of a respective set, selecting causing said plurality of computers to:
determine the age of each stored replica,
determine whether any stored replicas is older than a selected age, and for any replicas older than said selected age,
determine whether an access count for stored replicas is less than a selected count, and for any replicas with said access count lower than said selected count,
determine whether the number of stored replicas is fewer than the number determined for storing, and whenever said number of stored replicas is at or above the number for storing,
delete one or more stored replicas, and
store said copy as a replica with an identified one of said other members whenever said number is fewer, whereby the volume of redundant stored data in enterprise-wide collaborative projects is reduced for increased storage capacity and maximized replica availability.

8. A computer program product for managing enterprise network peer-to-peer storage as in claim 7, wherein said computer readable program code causing said one or more computers to determine whether to store replicas causes said one or more computers to:

extract a list of tags (T);
infer a context for said requested file; and
retrieve a social circle (C) responsive to said context and information (n) from related statistics (S), the number of replicas (v) is determined by $v = \Sigma_{i=1}^{i=N} f_i(n_i)$, wherein said related statistics (S) are selected from: the number of group members, a number of messages exchanged between group members, a number of user activities posted in community documents, a number of user activities posted in profile related documents and information, a number of uploaded files, a number of accesses to files having the same tag, a number of accesses to past file versions, and a tag/context relevance;
identify said other members as candidates for storing said replicas;
select said set of members from said candidates; and
display a list listing said set.

9. A computer program product for managing enterprise network peer-to-peer storage as in claim 7, wherein whenever said access count is at or above said selected count, said computer readable program code further causing said plurality of computers executing said code to wait until said stored replicas are older than a popular file age before determining whether the number of stored replicas is fewer than the number determined for storing.

10. A computer program product for managing enterprise network peer-to-peer storage as in claim 7, wherein said computer readable program code causing said one or more computers to store said copy causes said one or more computers to:

identify said other members as replica storage candidates;
send a request to store said copy to said replica storage candidates; and
store said copy with one of said replica storage candidates.

11. A method of managing enterprise network peer-to-peer shared storage, said method comprising:

logging into an enterprise social platform with a unique identification (ID), said ID identifying a respective user within said enterprise social platform;

requesting a copy of a file associated with an enterprise network group, a plurality of identified users being members of said enterprise network group, each group having one or more associated files with a plurality of replicas, each said plurality of replicas being distributed among a set of group members, said set being fewer than all of the group members and selected to maximize replica availability to group members;

determining whether a replica of the requested said copy is stored with other group members;

retrieving said copy, a replica being retrieved if replicas have been stored with other members, otherwise retrieving said copy from said enterprise social platform; and managing locally stored replicas and selectively storing said copy with members of a respective set, managing comprising:
determining the age of each stored replica,
determining whether any stored replicas is older than a selected age, and for any replicas older than said selected age,
determining whether an access count for stored replicas is less than a selected count, and for any replicas with said access count lower than said selected count,
determining whether the number of stored replicas is fewer than the number determined for storing, and whenever said number of stored replicas is at or above the number for storing,
deleting one or more stored replicas, and
storing said copy as a replica with an identified one of said other members whenever said number is fewer, whereby the volume of redundant stored data in enterprise-wide collaborative projects is reduced for increased storage capacity and maximized replica availability.

12. A method as in claim 11, wherein whenever said access count is at or above said selected count, said method further comprises waiting until said stored replicas are older than a popular file age before proceeding to determine whether the number of stored replicas is fewer than the number determined for storing.

13. A method as in claim 11, wherein storing said copy comprises:
- identifying said other members as replica storage candidates;
- sending a request to store said copy to said replica storage candidates; and
- storing said copy with one of said replica storage candidates.

14. A method as in claim 11, wherein whenever said number of stored replicas is at or above the number for storing, said method comprises deleting one or more stored replicas.

\* \* \* \* \*